US012718799B2

(12) United States Patent
Audhkhasi et al.

(10) Patent No.: US 12,718,799 B2
(45) Date of Patent: Aug. 25, 2026

(54) ZERO-SHOT TASK EXPANSION OF ASR MODELS USING TASK VECTORS

(71) Applicant: Google LLC, Mountain View, CA (US)

(72) Inventors: Kartik Audhkhasi, Mountain View, CA (US); Gowtham Ramesh, Mountain View, CA (US); Bhuvana Ramabhadran, Mt. Kisco, NY (US)

(73) Assignee: Google LLC, Mountain View, CA (US)

( * ) Notice: Subject to any disclaimer, the term of this patent is extended or adjusted under 35 U.S.C. 154(b) by 162 days.

(21) Appl. No.: 18/817,181

(22) Filed: Aug. 27, 2024

(65) Prior Publication Data

US 2025/0078813 A1 Mar. 6, 2025

Related U.S. Application Data

(60) Provisional application No. 63/580,739, filed on Sep. 6, 2023.

(51) Int. Cl.
*G10L 15/00* (2013.01)
*G10L 15/06* (2013.01)

(52) U.S. Cl.
CPC .................................. *G10L 15/063* (2013.01)

(58) Field of Classification Search
CPC ....... G10L 15/063; G10L 15/06; G10L 15/00; G10L 2015/0636; G10L 15/065; G10L 15/075; G10L 15/083; G10L 2015/085; G10L 15/16; G10L 17/18; G10L 17/04; G10L 21/0364; G10L 25/51; G06F 30/27; G06F 18/24; G06F 40/20; G06N 20/00; G06N 3/045; G06N 3/02; G06N 3/0464;
(Continued)

(56) References Cited

U.S. PATENT DOCUMENTS

| | | | | |
|---|---|---|---|---|
| 2024/0290321 | A1* | 8/2024 | Wang | G10L 15/26 |
| 2024/0420687 | A1* | 12/2024 | Sainath | G06N 3/0495 |
| 2026/0031092 | A1* | 1/2026 | Gao | G10L 19/0017 |

OTHER PUBLICATIONS

Wang, Weiran, et al. "Multi-output RNN-T joint networks for multi-task learning of ASR and auxiliary tasks." ICASSP 2023-2023 IEEE International Conference on Acoustics, Speech and Signal Processing (ICASSP). IEEE, 2023. (Year: 2023).*

(Continued)

*Primary Examiner* — Edgar X Guerra-Erazo

(74) *Attorney, Agent, or Firm* — Honigman LLP; Brett A. Krueger; Grant Griffith

(57) ABSTRACT

A method includes training, using an un-supervised learning technique, an auxiliary ASR model based on a first set of un-transcribed source task speech utterances to determine a first task vector, training, using the un-supervised learning technique, the auxiliary ASR model based on a second set of un-transcribed speech utterances to determine a second task vector, and training, using the un-supervised learning technique, the auxiliary ASR model based on un-transcribed target task speech utterances to determine a target task vector. The method also includes determining a first correlation between the first and target task vectors, determining a second correlation between the second and target task vectors, and adapting parameters of a trained primary ASR model based on the first and second source task vectors and the first and second correlations to teach the primary ASR model to learn how to recognize speech associated with the target task.

20 Claims, 8 Drawing Sheets

(58) Field of Classification Search
CPC .......... G06N 3/09; G06N 3/088; G06N 3/094; G06N 3/096; G06N 3/091; G06N 3/0895; G06N 3/0455; G06N 3/0442; G06N 3/044; G06N 3/0499; G06N 3/047; G06N 3/0475; G06N 3/048
See application file for complete search history.

(56) References Cited

OTHER PUBLICATIONS

Yusuf, Bolaji, Ankur Gandhe, and Alex Sokolov. "USTED: Improving ASR with a unified speech and text encoder-decoder." ICASSP 2022-2022 IEEE International Conference on Acoustics, Speech and Signal Processing (ICASSP). IEEE, 2022. (Year: 2022).*
Ramesh Gowtham et al: "Task Vector Algebra for ASR Models", ICASSP 2024-2024 IEEE International Conference on Acoustics, Speech and Signal Processing (ICASSP), IEEE, Apr. 14, 2024 (Apr. 14, 2024), pp. 12256-12260, XP034654418.
Yu Zhang et al: "Google USM: Scaling Automatic Speech Recognition Beyond 100 Languages", arvix.org, Cornell University Library, 201 Olin Library Cornell University Ithaca, NY 14853, Mar. 2, 2023 (Mar. 2, 2023), XP091450519.
Ilharco Gabriel et al: "<mark>Editing Models with Task Arithmetic</mark>", arXiv.org, Mar. 31, 2023 (Mar. 31, 2023), XP093212425.
International Search Report and Written Opinion issued in related PCT Application No. PCT/US2024/044082, dated Oct. 22, 2024.

* cited by examiner

ZERO-SHOT TASK EXPANSION OF ASR MODELS USING TASK VECTORS

CROSS REFERENCE TO RELATED APPLICATIONS

This U.S. Patent Application claims priority under 35 U.S.C. § 119(e) to U.S. Provisional Patent Application No. 63/580,739, filed on Sep. 6, 2023. The disclosure of this prior application is considered part of the disclosure of this application and is hereby incorporated by reference in its entirety.

TECHNICAL FIELD

This disclosure relates to zero-shot task expansion of automatic speech recognition (ASR) models using task vectors.

BACKGROUND

Automatic speech recognition (ASR) is the process of transcribing input audio into text. ASR is an increasingly important technology that may be used to enable a user to interact with mobile or other devices using spoken (i.e., speech-based) interactions.

SUMMARY

One aspect of the disclosure provides a computer-implemented method executed on data processing hardware that causes the data processing hardware to perform operations. The operations include receiving training data including transcribed source task speech utterances associated with a first source task and a second source task, a first set of un-transcribed source task speech utterances associated with the first source task, each first un-transcribed source task speech utterance in the first set of un-transcribed source task speech utterances is not paired with a corresponding transcription, a second set of un-transcribed source task speech utterances associated with the second source task, each second set of un-transcribed source task speech utterances is not paired with a corresponding transcription, and un-transcribed target task speech utterances associated with a target task, each un-transcribed target task speech utterance is not paired with a corresponding transcription. The operations also include training a primary automatic speech recognition (ASR) model based on the transcribed source task speech utterances associated with the first source task and the second source task, the trained primary ASR model having a plurality of model parameter values, training, using an un-supervised learning technique, an auxiliary ASR model initialized with the plurality of model parameter values of the trained primary ASR model based on the first set of un-transcribed source task speech utterances associated with the first source task to determine a first source task vector, training, using the un-supervised learning technique, the auxiliary ASR model initialized with the plurality of model parameter values of the trained primary ASR model based on the second set of un-transcribed source task speech utterances associated with the second source task to determine a second source task vector, and training, using the un-supervised learning, the auxiliary ASR model initialized with the plurality of model parameter values of the trained primary ASR model based on the un-transcribed target task speech utterances associated with the target task to determine a target task vector. The operations further include determining a first correlation between the first source task vector and the target task vector, determining a second correlation between the second source task vector and the target task vector, and adapting parameters of the trained primary ASR model based on the first source task vector, the second source task vector, the first correlation, and the second correlation to teach the trained primary ASR model to learn how to recognize speech associated with the target task.

Implementations of the disclosure may include one or more of the following optional features. In some implementations, adapting the parameters of the trained primary ASR model to learn how to recognize speech associated with the target task includes adapting the parameters of the trained primary ASR model without using any transcribed speech utterances in the target task for supervised learning. In some examples, the un-supervised learning technique for training the auxiliary ASR model based on the first set of un-transcribed source task speech utterances, the second set of un-transcribed source task speech utterances, and the un-transcribed target task speech utterances includes training using Bidirectional Encoder Representations from Transformers (BERT) based Speech pre-Training with Random-projection Quantization (BEST-RQ).

In some examples, the un-supervised learning technique for training the auxiliary ASR model based on a particular set of un-transcribed source task speech utterances includes, for each corresponding un-transcribed speech utterance in the particular set of un-transcribed speech utterances: generating, at each of a plurality of output steps, using a random-projection quantizer, a target quantized vector token and a target token index for a corresponding audio feature in a sequence of audio features associated with the corresponding un-transcribed speech utterance, wherein the target token index maps the corresponding audio feature to the target quantized vector token stored in one or more codebooks; after masking a subset of the audio features in the sequence of audio features associated with the corresponding un-transcribed speech utterance, generating contrastive context vectors from corresponding masked audio features; and deriving a contrastive loss term between the contrastive context vectors at the masked positions and the target token index. The un-supervised learning technique for training the auxiliary ASR model based on a particular set of un-transcribed source task speech utterances also includes pre-training an audio encoder of the auxiliary ASR model based on the contrastive loss terms determined for the particular set of un-transcribed speech utterances.

In some implementations, training the primary ASR model includes training the primary ASR model, using supervised learning, based on the transcribed source task speech utterances, and each transcribed source task speech utterance paired with a corresponding transcription. In some examples, training the primary ASR model includes training the primary ASR model initialized with a second plurality of model parameter values based on a first set of the transcribed source task speech utterances associated with the first source task to determine a third source task vector, training the primary ASR model initialized with the second plurality of model parameter values based on a second set of the transcribed source task speech utterances associated with the second source task to determine a fourth source task vector, and adapting parameter values of the primary ASR model based on the third source task vector and the fourth source task vector to teach the ASR model how to recognize speech associated with the first source task and the second source task. Adapting parameter values of the primary ASR model based on the third source task vector and the fourth source task vector may include determining a sum of the second plurality of model parameter values, a first product of a first scale factor and the third source task vector, and a second product of a second scale factor and the fourth source task vector.

In some examples, the transcribed source task speech utterances associated with the first source task include a first amount of training data, the un-transcribed target task speech utterances associated with the target task include a second amount of training data, and the first amount of training data greater than the second amount of training data. The source task may be at least one of a source language, a source speech domain, or a source speech characteristic of a source speaker. The target task may be at least one of a target language, a target speech domain, or a target speech characteristic of a target speaker.

Another aspect of the disclosure provides a system including data processing hardware and memory hardware in communication with the data processing hardware. The memory hardware stores instructions that, when executed on the data processing hardware, cause the date processing hardware to perform operations. The operations include receiving training data including transcribed source task speech utterances associated with a first source task and a second source task, a first set of un-transcribed source task speech utterances associated with the first source task, each first un-transcribed source task speech utterance in the first set of un-transcribed source task speech utterances is not paired with a corresponding transcription, a second set of un-transcribed source task speech utterances associated with the second source task, each second set of un-transcribed source task speech utterances is not paired with a corresponding transcription, and un-transcribed target task speech utterances associated with a target task, each un-transcribed target task speech utterance is not paired with a corresponding transcription. The operations also include training a primary automatic speech recognition (ASR) model based on the transcribed source task speech utterances associated with the first source task and the second source task, the trained primary ASR model having a plurality of model parameter values, training, using an un-supervised learning technique, an auxiliary ASR model initialized with the plurality of model parameter values of the trained primary ASR model based on the first set of un-transcribed source task speech utterances associated with the first source task to determine a first source task vector, training, using the un-supervised learning technique, the auxiliary ASR model initialized with the plurality of model parameter values of the trained primary ASR model based on the second set of un-transcribed source task speech utterances associated with the second source task to determine a second source task vector, and training, using the un-supervised learning, the auxiliary ASR model initialized with the plurality of model parameter values of the trained primary ASR model based on the un-transcribed target task speech utterances associated with the target task to determine a target task vector. The operations further include determining a first correlation between the first source task vector and the target task vector, determining a second correlation between the second source task vector and the target task vector, and adapting parameters of the trained primary ASR model based on the first source task vector, the second source task vector, the first correlation, and the second correlation to teach the trained primary ASR model to learn how to recognize speech associated with the target task.

Implementations of the disclosure may include one or more of the following optional features. In some implementations, adapting the parameters of the trained primary ASR model to learn how to recognize speech associated with the target task includes adapting the parameters of the trained primary ASR model without using any transcribed speech utterances in the target task for supervised learning. In some examples, the un-supervised learning technique for training the auxiliary ASR model based on the first set of un-transcribed source task speech utterances, the second set of un-transcribed source task speech utterances, and the un-transcribed target task speech utterances includes training using Bidirectional Encoder Representations from Transformers (BERT) based Speech pre-Training with Random-projection Quantization (BEST-RQ).

In some examples, the un-supervised learning technique for training the auxiliary ASR model based on a particular set of un-transcribed source task speech utterances includes, for each corresponding un-transcribed speech utterance in the particular set of un-transcribed speech utterances: generating, at each of a plurality of output steps, using a random-projection quantizer, a target quantized vector token and a target token index for a corresponding audio feature in a sequence of audio features associated with the corresponding un-transcribed speech utterance, wherein the target token index maps the corresponding audio feature to the target quantized vector token stored in one or more codebooks; after masking a subset of the audio features in the sequence of audio features associated with the corresponding un-transcribed speech utterance, generating contrastive context vectors from corresponding masked audio features; and deriving a contrastive loss term between the contrastive context vectors at the masked positions and the target token index. The un-supervised learning technique for training the auxiliary ASR model based on a particular set of un-transcribed source task speech utterances also includes pre-training an audio encoder of the auxiliary ASR model based on the contrastive loss terms determined for the particular set of un-transcribed speech utterances.

In some implementations, training the primary ASR model includes training the primary ASR model, using supervised learning, based on the transcribed source task speech utterances, and each transcribed source task speech utterance paired with a corresponding transcription. In some examples, training the primary ASR model includes training the primary ASR model initialized with a second plurality of model parameter values based on a first set of the transcribed source task speech utterances associated with the first source task to determine a third source task vector, training the primary ASR model initialized with the second plurality of model parameter values based on a second set of the transcribed source task speech utterances associated with the second source task to determine a fourth source task vector, and adapting parameter values of the primary ASR model based on the third source task vector and the fourth source task vector to teach the ASR model how to recognize speech associated with the first source task and the second source task. Adapting parameter values of the primary ASR model based on the third source task vector and the fourth source task vector may include determining a sum of the second plurality of model parameter values, a first product of a first scale factor and the third source task vector, and a second product of a second scale factor and the fourth source task vector.

In some examples, the transcribed source task speech utterances associated with the first source task include a first amount of training data, the un-transcribed target task speech utterances associated with the target task include a second amount of training data, and the first amount of training data greater than the second amount of training data. The source task may be at least one of a source language, a source speech domain, or a source speech characteristic of a source speaker. The target task may be at least one of a target language, a target speech domain, or a target speech characteristic of a target speaker.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Automatic speech recognition (ASR) is the process of transcribing input audio into text. ASR is an increasingly important technology that may be used to enable a user to interact with mobile or other devices using spoken (i.e., speech-based) interactions. The expansion (which may also be referred to as extending) of ASR models is an important problem for several applications of ASR technology. That is, to adapt an ASR model trained using audio data associated with a source task to perform a different target task. For example, extending an ASR model trained using audio data taken from a YouTube channel (i.e., a source task) to perform searches responsive to spoken utterances (i.e., a target task), extending an ASR model trained using utterances spoken by typical speakers (i.e., a source task) to perform ASR for atypical speakers (i.e., a target task), extending an ASR model trained to understand utterances spoken in Hindi (i.e., a source task) to perform ASR for utterances spoken in Kannada (i.e., a target task), or extending an ASR model from a source task trained with a large amount of training data to a target task having only a limited amount of training data. In many circumstances, there is little to no available supervised training data (e.g., transcriptions) for training the ASR model to perform the target task. Unfortunately, conventional approaches for expanding an ASR model rely on the availability of a sufficient quantity of supervised training data for a target task. Therefore, there is a need for methods and systems for performing zero-shot task expansion (i.e., without supervised training data) of ASR models. That is, for extending an ASR model trained for a source task to a target task using only unsupervised training data (e.g., utterances without corresponding transcriptions) for the target task.

Figure 1:
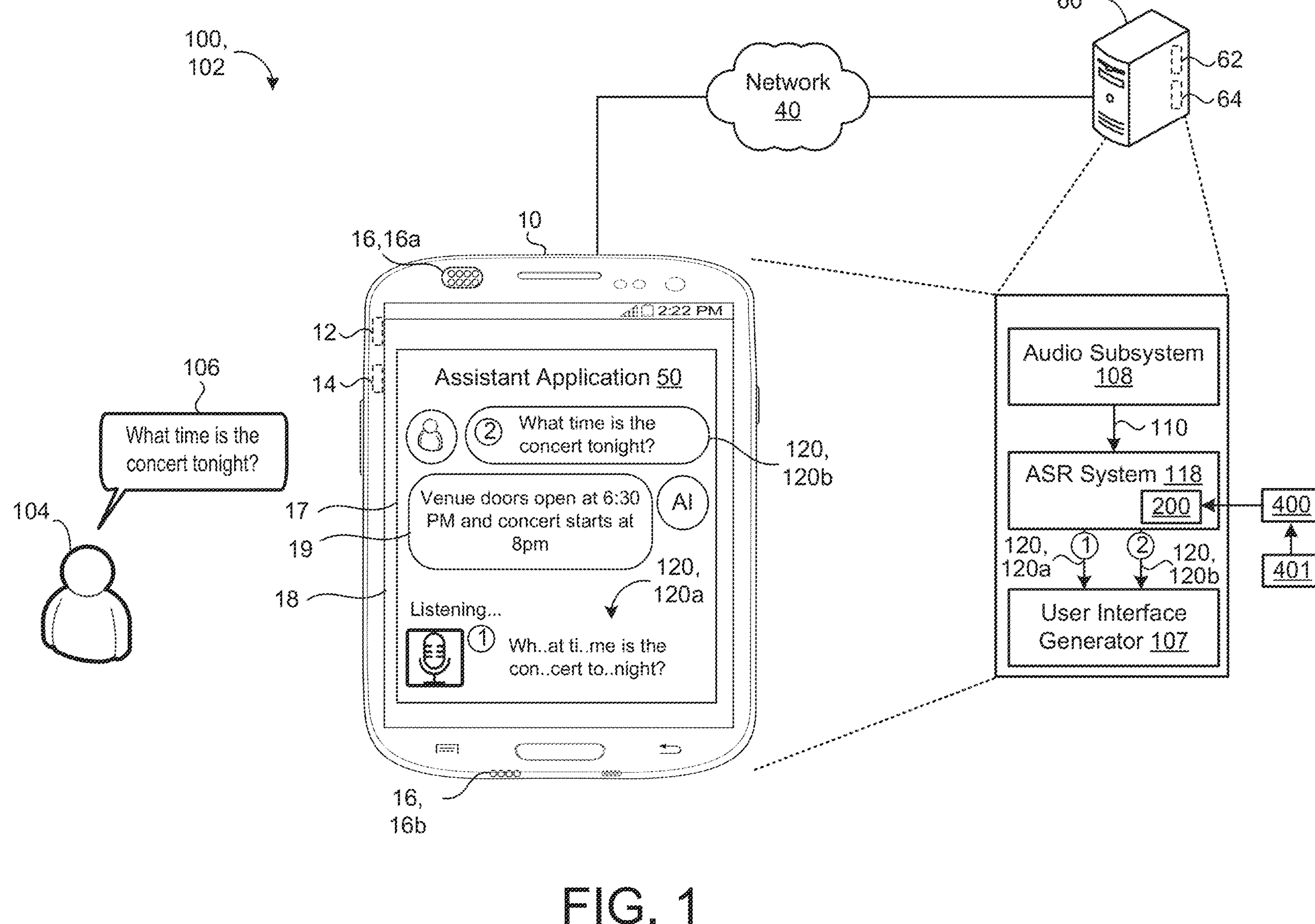
FIG. 1 is a schematic view of an example automatic speech recognition system.

FIG. 1 is an example system 100 that includes one or more users 104 interacting with a user device 10 through voice input in an environment 102 of the system 100. The user device 10 (also referred to generally as a user device 10) is configured to capture sounds (e.g., streaming audio data 110) from the one or more users 104 within the system 100. Here, the streaming audio data 110 may refer to an utterance 106 spoken by the user 104 that functions as an audible query, a command for the user device 10, or an audible communication captured by the user device 10. Speech-enabled systems of the user device 10 may field the query or the command by answering the query and/or causing the command to be performed/fulfilled by one or more downstream applications.

The user device 10 may correspond to any computing device associated with the user 104 and capable of receiving audio data. Some examples of user devices 10 include, but are not limited to, mobile devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions that, when executed by the data processing hardware 12, cause the data processing hardware 12 to perform one or more operations. The user device 10 further includes an audio system 16 with an audio capture device 16*a* (e.g., a microphone) for capturing and converting the utterances 106 into electrical signals, and a speech output device 16*b* (e.g., a speaker) for communicating with an audible audio signal (e.g., as output data from the user device 10). The user device 10 may implement an array of audio capture devices 16*a* without departing from the scope of the present disclosure, whereby one or more capture devices 16*a* in the array may not physically reside on the user device 10, but may be in communication with the audio system 16.

The system 100 includes an automated speech recognition (ASR) system 118 that implements an ASR model 200 and resides on the user device 10 of the user 104 and/or on a remote computing system 60 (e.g., one or more remote servers of a distributed system executing in a cloud-computing environment) in communication with the user device 10 via a network 40. The remote computing system 60 may include physical and/or virtual (e.g., cloud based) resources, such as data processing hardware 62 (e.g., remote servers or CPUs) and/or memory hardware 64 (e.g., remote databases or other storage hardware). The memory hardware 64 is in communication with the data processing hardware 62 and stores instructions that, when executed by the data processing hardware 62, cause the data processing hardware 62 to perform one or more operations.

The user device 10 and/or the remote computing system 60 also includes an audio subsystem 108 configured to receive the utterance 106 spoken by the user 104 and captured by the audio capture device 16*a*, and convert the utterance 106 into a corresponding digital format associated with input acoustic frames 110 capable of being processed by the ASR system 18. In the example shown, the user speaks a respective utterance 106 and the audio subsystem 108 converts the utterance 106 into a corresponding sequence of acoustic frames 110 for input to the ASR system 118. Thereafter, the ASR model 200 receives, as input, the sequence of acoustic frames 110 corresponding to the utterance 106, and generates/predicts a corresponding transcription 120 (e.g., speech recognition result/hypothesis) of the utterance 106 as the ASR model 200 receives (e.g., processes) each acoustic frame 110 in the sequence of acoustic frames 110.

In the example shown, the ASR model 200 may perform streaming speech recognition to produce an initial speech recognition result 120, 120*a* and generate a final speech recognition result 120, 120*b* by improving the initial speech recognition result 120*a*. The speech recognition results 120 may either correspond to a partial speech recognition result or an entire speech recognition result. Stated differently, the speech recognition result 120 may either correspond to a portion of an utterance 106 or an entire utterance 106. For example, the partial speech recognition result may correspond to a portion of a spoken utterance 106 or even a portion of a spoken term. However, as will become apparent, the ASR model 200 may perform additional processing on the final speech recognition result 120*b* whereby the final speech recognition result 120*b* may be delayed from the initial speech recognition result 120*a*.

The user device 10 and/or the remote computing system 60 also executes a user interface generator 107 configured to present a representation of the transcription 120 of the utterance 106 to the user 104 of the user device 10. As described in greater detail below, the user interface generator 107 may display the initial speech recognition results 120*a* in a streaming fashion during time 1 and subsequently display the final speech recognition results 120*b* in a streaming fashion during time 2. In some configurations, the transcription 120 output from the ASR system 118 is processed, e.g., by a natural language understanding (NLU) or natural language processing (NLP) module executing on the user device 10 or the remote computing system 60, to execute a user command/query specified by the utterance 106. Additionally or alternatively, a text-to-speech system (not shown) (e.g., executing on any combination of the user device 10 or the remote computing system 60) may convert the transcription 120 into synthesized speech for audible output by the user device 10 and/or another device.

In the example shown, the user 104 interacts with a digital assistant application 50 or other program of the user device 10 that uses the ASR system 118. For instance, FIG. 1 depicts the user 104 communicating with the digital assistant application 50 and the digital assistant application 50 displaying a digital assistant interface 17 on a screen 18 of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16*a* and processed by audio subsystem 108 of the user device 10. In this example, the audio subsystem 108 receives the spoken utterance 106 and converts it into a sequence of acoustic frames 110 for input to the ASR system 118.

Continuing with the example, the ASR model 200, while receiving the sequence of acoustic frames 110 corresponding to the utterance 106 as the user 104 speaks, encodes the sequence of acoustic frames 110 and then decodes the encoded sequence of acoustic frames 110 into the initial speech recognition results 120*a*. During time 1, the user interface generator 107 presents, via the digital assistant interface 17, a representation of the initial speech recognition results 120*a* of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 17, a representation of the final speech recognition results 120*b* of the utterance 106 to the user 104 of the user device 10 in a streaming fashion such that words, word pieces, and/or individual characters appear on the screen as soon as they are generated by the ASR model 200. In some implementations, the user interface generator 107 replaces the representation of the initial speech recognition results 120*a* presented at time 1 with the representation of the final speech recognition results 120*b* presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition results 120*a* at an earlier time than the final speech recognition results 120*b*. For instance, as the final speech recognition result 120*b* is presumed to be more accurate than the initial speech recognition result 120*a*, the final speech recognition result 120*b* ultimately displayed as the transcription 120 may fix any terms that may have been misrecognized in the initial speech recognition results 120*a*. In this example, the streaming initial speech recognition results 120*a* output by the ASR model 200 are displayed on the screen of the user device 10 at time 1 are associated with low latency and provide responsiveness to the user 104 that his/her query is being processed, while the final speech recognition result 120*b* output by the ASR model 200 and displayed on the screen at time 2 leverages an additional speech recognition model and/or a language model to improve the speech recognition quality in terms of accuracy, but at increased latency. However, since the initial speech recognition results 120*a* are displayed as the user speaks the utterance 106, the higher latency associated with producing, and ultimately displaying the final speech recognition results 120*b* is not noticeable to the user 104.

The final speech recognition result 120*b* is presumed to be more accurate than the initial speech recognition result 120*a* because the ASR model 200 determines the initial speech recognition results 120*a* in a streaming fashion and the final speech recognition results 120*b* using the prior non-blank symbols from the initial speech recognition result 120*a*. That is, the final speech recognition results 120*b* take into account the prior non-blank symbols and, thus, are presumed more accurate because the initial speech recognition results 120*a* do not take into account any prior non-blank symbols. Moreover, a rescorer (not shown for clarity of illustration) may update the initial speech recognition result 120*a* with the final speech recognition result 120*b* to provide the transcription via the user interface generator 107 to the user 104.

In the example shown in FIG. 1, the digital assistant application 50 may respond to the question posed by the user 104 using NLP or NLU. NLP/NLU generally refer to a process of interpreting written language (e.g., the initial speech recognition result 120*a* and/or the final speech recognition result 120*b*) and determining whether the written language prompts any action. In this example, the digital assistant application 50 uses NLP/NLU to recognize that the question 106 from the user 104 regards the user's schedule and more particularly a concert on the user's schedule. By recognizing these details with NLP/NLU, the automated assistant returns a response 19 to the user's query where the response 19 states, "Venue doors open at 6:30 PM and concert starts at 8 pm." In some configurations, NLP/NLU occurs on the remote computing system 60 in communication with the data processing hardware 12 of the user device 10.

As described below in connection with FIG. 4A, a task expansion training method 400, 400*a* may perform zero-shot task expansion of the ASR model 200 using task vector algebra. As described below in connection with FIG. 4B, a task expansion training method 400, 400*b* may perform training of the ASR model 200 for a target task having a limited amount of training data based on a source task having a large amount of training data.

Figure 2:
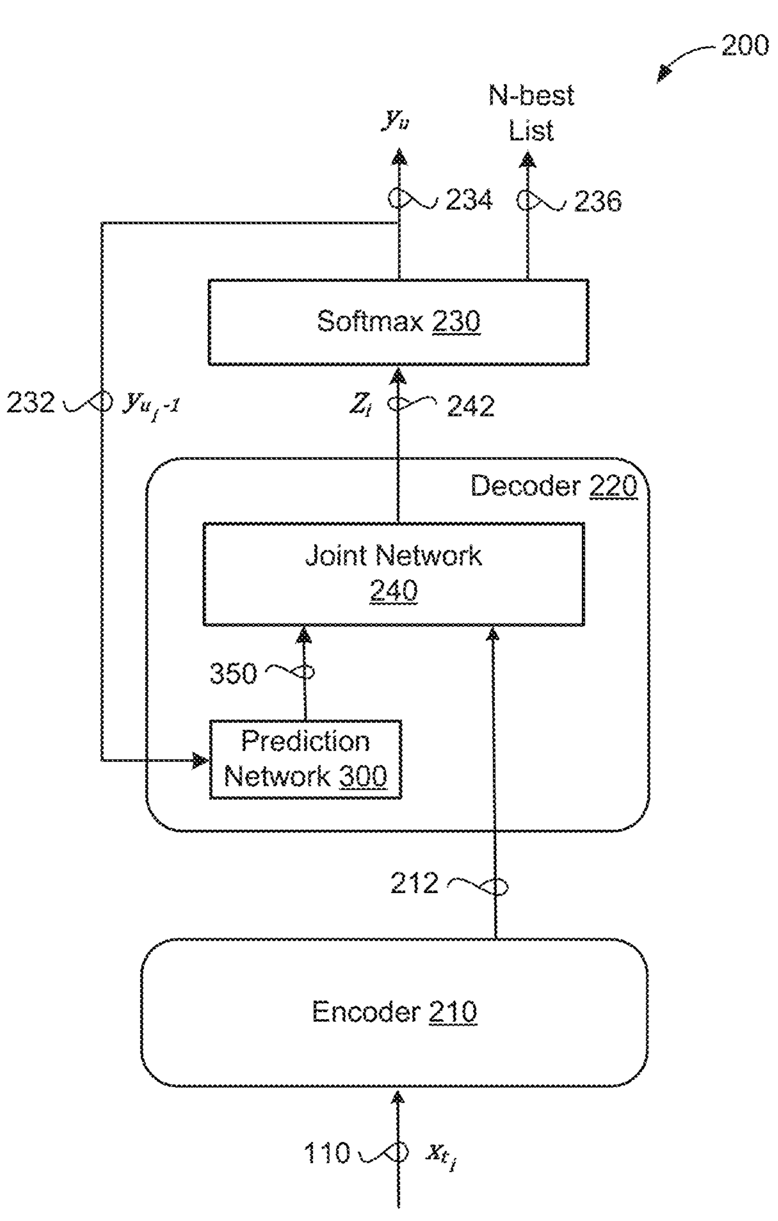
FIG. 2 is a schematic view of an example automatic speech recognition model.

FIG. 2 depicts an example ASR model 200 that includes a Recurrent Neural Network-Transducer (RNN-T) model architecture. The ASR model 200 may also be referred to herein as RNN-T model 200. The use of the RNN-T model architecture is exemplary only, and the ASR model 200 may include other architectures such as transformer-transducer and conformer-transducer model architectures, among others. The RNN-T model architecture provides a small computational footprint and utilizes less memory requirements than conventional ASR architectures, making the RNN-T model architecture suitable for performing speech recognition entirely on the user device 10 (e.g., no communication with a remote computing system or server is required). Example training processes 400 for training the ASR model 200 are described below in connection with FIGS. 5 and 6.

As shown, the ASR model 200 includes an encoder 210, a decoder 220, and a final Softmax layer 230 (also referred to herein as Softmax Layer 230). Here, the encoder 210 and the decoder 220 form the architecture of the RNN-T model 200. The encoder 210, which is roughly analogous to an acoustic model (AM) in a traditional ASR system, may include a recurrent network of stacked Long Short-Term Memory (LSTM) layers. Here, the encoder 210 receives a sequence of d-dimensional feature vectors (e.g., acoustic frames 110 (FIG. 1)) $X=(x_1, x_2, \ldots, x_T)$, and generates, at each time step, a higher-order feature representation 212 for a corresponding acoustic frame 110 in the sequence of acoustic frames 110.

In the illustrated example, the decoder 220 includes a prediction network 300 and a joint network 240. The prediction network 300 may include a LSTM network and, like a language model (LM), receives, as input, a respective sequence of non-blank symbols $\{y_{u_i-1}, y_{u_i-2}, \ldots\}$ 232 output by the Softmax layer 230 and generates, at each time step, a dense representation 350. As described in greater detail below, the dense representation 350 may include a single embedding vector. Notably, the sequence of non-blank symbols 232 received at a prediction network 300 captures linguistic dependencies between non-blank symbols 232 predicted during the previous time steps so far to assist the joint network 240 in predicting the probability of a next output symbol $y_u$ or blank symbol during the current time step. As described in greater detail below, to contribute to techniques for reducing the size of the prediction network 300 without sacrificing accuracy/performance of the ASR model 200, a prediction network 300 may receive a limited-history sequence of non-blank symbols 232 $\{y_{u_i-1}, \ldots, y_{u_i-N}\}$ that is limited to the N previous non-blank symbols 232 output by the Softmax layer 230.

The joint network 240 combines a respective higher-order feature representation 212 produced by the encoder 210 and the dense representation 350 (e.g., a single embedding vector 350) produced by the prediction network 300. The joint network 240 predicts a distribution $Z_i=P(y_i|x_{t_i}, y_0, \ldots, y_{u_{i-1}})$ 242 over the next output symbol. Stated differently, the joint network 240 generates, at each time step, a respective probability distribution 242 over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 240 may output a set of values indicative of the likelihood of occurrence of each of a predetermined set of output labels. This set of values can be a vector and indicates a probability distribution over the set of output labels. In some cases, the output labels are graphemes (e.g., individual characters, and potentially punctuation and other symbols), but the set of output labels is not so limited. For example, the set of output labels may include wordpieces and/or entire words, in addition to or instead of graphemes. The output distribution 242 of the joint network 240 may include a posterior probability value for each of the different output labels. Thus, if there are 100 different output labels representing different graphemes or other symbols, the output 242 of the joint network 240 may include 100 different probability values, one for each output label. The probability distribution may then be used to select and assign scores to candidate orthographic elements (e.g., graphemes, wordpieces, and/or words) in a beam search process (e.g., by the Softmax layer 230) for determining the transcription 120.

Notably, the decoder 220 does not make a conditional independence assumption, rather the prediction of each symbol $y_u$ 232 is conditioned not only on the acoustics but also on the sequence of labels $\{y_{u_i-1}, y_{u_i-2}, \ldots\}$ 232 output so far. The decoder 220 assumes an output symbol 232 is independent of future acoustic frames 110, which allows the ASR model 200 to be employed in a streaming fashion.

The Softmax layer 230 receives the probability distribution for a final speech recognition result and selects the speech recognition hypothesis 234 with the highest probability to produce the transcription 120. The Softmax layer 230 may employ any technique to select the speech recognition hypothesis 234 with the highest probability in the distribution 242. In some examples, the Softmax layer 230 selects and assigns scores to candidate orthographic elements (e.g., graphemes, wordpieces, and/or words) in a beam search process (e.g., by the Softmax layer 230) for determining the transcription 120. For instance, the Softmax layer 230 may generate, based the probability distributions 242 for a plurality of output time steps, an n-best list of predicted speech recognition hypotheses 236 for an utterance 106 using a beam search decoding process.

Figure 3:
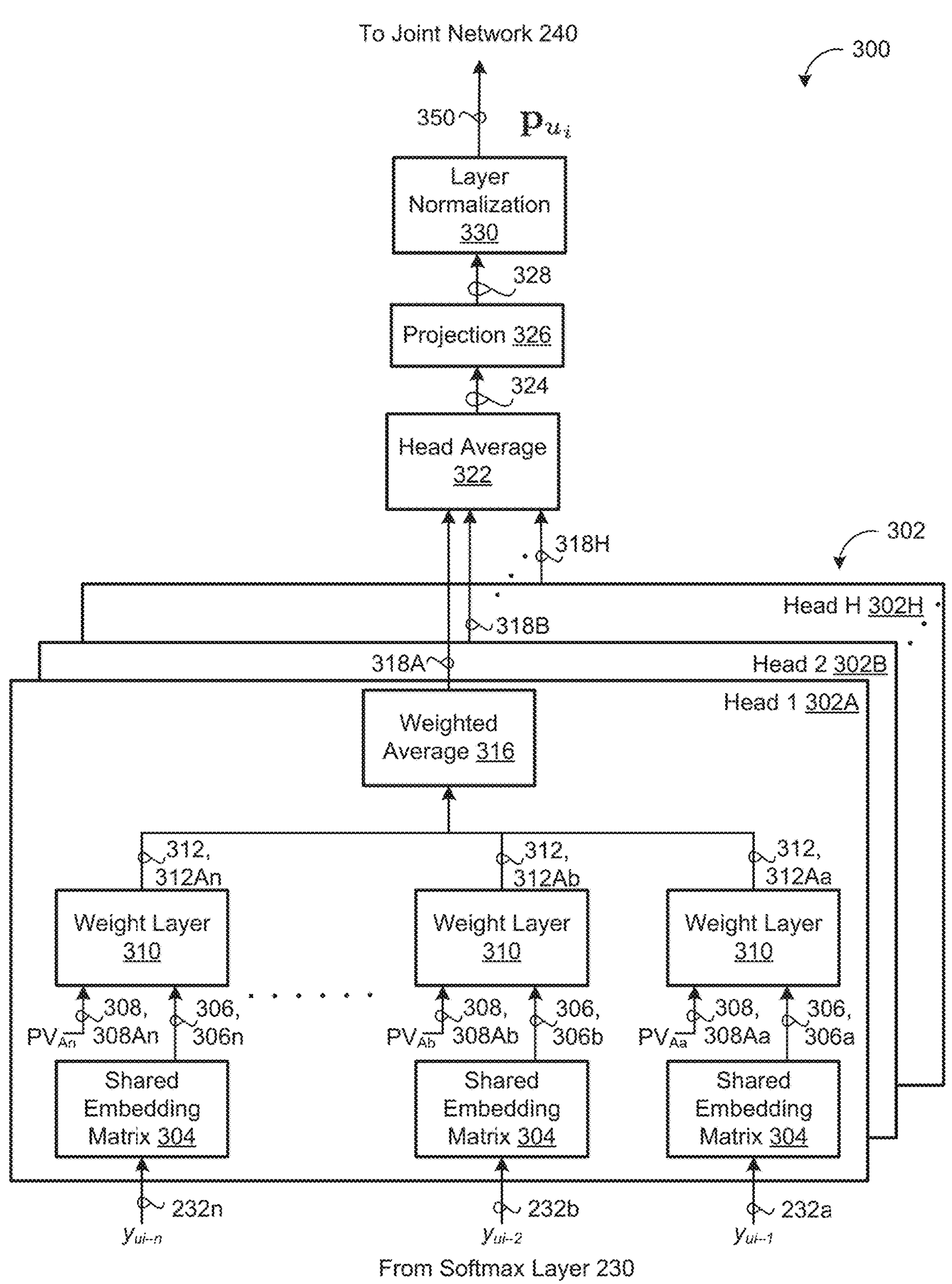
FIG. 3 is a schematic view of an example prediction network.

FIG. 3 is a schematic view of an example prediction network 300 for the ASR model 200. The prediction network 300 receives, as input, a sequence of non-blank symbols $\{y_{u_i-1}, \ldots, y_{u_i-N}\}$ 232*a-n* that is limited to the N previous non-blank symbols 232*a-n* output by the Softmax layer 230. In some examples, N is equal to two. In other examples, N is equal to five. However, N may equal any integer. The sequence of non-blank symbols 232*a-n* indicates an initial speech recognition result 120*a* (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306*a-n* (e.g., $X \in \mathbb{R}^{N \times d_e}$) for each non-blank symbol among the sequence of non-blank symbols $\{y_{u_i-1}, y_{u_i-2}, \ldots\}$ 232*a-n* received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the $\mathbb{R}$ sequence of non-blank symbols 232*a-n*. The respective position vector PV 308 assigned to each non-blank symbol indicates a position in the history of the sequence of non-blank symbols (e.g., the N previous non-blank symbols 232*a-n* output by the Softmax layer 230). For instance, the first position vector $PV_{Aa}$ is assigned to a most recent position in the history, while the last position vector $PV_{An}$ is assigned to a last position in the history of the N previous non-blank symbols 232 output by the Softmax layer 230. Notably, each of the embeddings 306 may include a same dimensionality (i.e., dimension size) as each of the position vectors PV 308.

While the corresponding embedding generated by shared embedding matrix 304 for each for each non-blank symbol among the sequence of non-blank symbols $\{y_{u_i-1}, y_{u_i-2}, \ldots\}$ 232*a-n*, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ $\mathbf{308}_{Ba-Bn}$, . . . , and the $H^{th}$ head 302 H defines another different row of position vectors $PV_{Ha-Hn}$ $\mathbf{308}_{Ha-Hn}$.

For each non-blank symbol in the sequence of non-blank symbols $\{y_{u_i-1}, y_{u_i-2}, \ldots\}$ 232*a-n* received, the first head 302A also weights, via a weight layer 310, the corresponding embedding 306 proportional to a similarity between the corresponding embedding and the respective position vector PV 308 assigned thereto. In some examples, the similarity includes a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H * N} \sum_{h,n} X_n * \sum_e (X_{n,e} * P_{h,n,e}) \tag{1}$$

In Equation (1), h represents the index of the heads 302, n represents position in context, and e represents the embedding dimension. Additionally, in Equation (1), H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $p_{u_i}$ 350 at the corresponding time step from the plurality of time steps. The prediction network 300 generates only a single embedding vector $p_{u_i}$ 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector $p_{u_i}$ 350.

In some implementations, to further reduce the size of the RNN-T decoder 220, i.e., the prediction network 300 and the joint network 240, parameter tying between the prediction network 300 and the joint network 240 is applied. Specifically, for a vocabulary size |V| and an embedding dimension $d_e$, the shared embedding matrix 304 at the prediction network is $E \in \mathbb{R}^{|V| \times d_e}$. Meanwhile, a last hidden layer includes a dimension size $d_h$ at the joint network 240, feed-forward projection weights from the hidden layer to the output logits will be $W \in \mathbb{R}^{d_h \times |V+1|}$, with an extra blank token in the vocabulary. Accordingly, the feed-forward layer corresponding to the last layer of the joint network 240 includes a weight matrix $[d_h, |V]|$. By having the prediction network 300 to tie the size of the embedding dimension $d_e$ to the dimensionality $d_h$ of the last hidden layer of the joint network 240, the feed-forward projection weights of the joint network 240 and the shared embedding matrix 304 of the prediction network 300 can share their weights for all non-blank symbols via a simple transpose transformation. Since the two matrices share all their values, the RNN-T decoder 220 only needs to store the values once on memory, instead of storing two individual matrices. By setting the size of the embedding dimension $d_e$ equal to the size of the hidden layer dimension $d_h$, the RNN-T decoder reduces a number of parameters equal to the product of the embedding dimension $d_e$ and the vocabulary size |V|. This weight tying corresponds to a regularization technique.

Figure 4A:
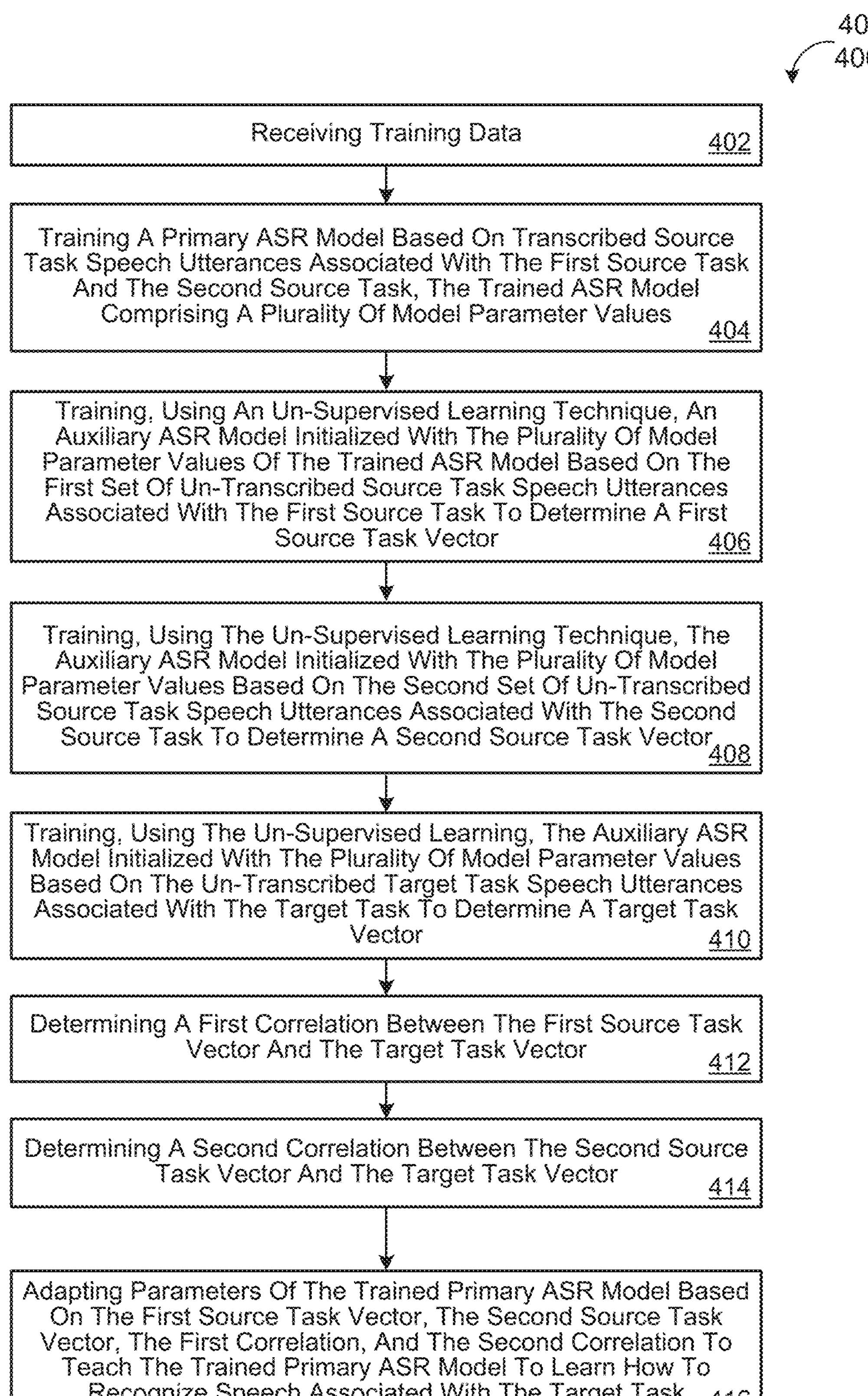
FIG. 4A is a flowchart of an arrangement of operations for an example computer-implemented method for performing zero-shot task expansion using task vector algebra.

FIG. 4A is a flowchart of an exemplary arrangement of operations for a computer-implemented task expansion training method 400, 400*a* for performing zero-shot task expansion of the ASR model 200 using task vector algebra. The operations of FIG. 4A may be performed by data processing hardware 710 (FIG. 7) (e.g., the data processing hardware 12 of the user device 10 or the data processing hardware 62 of the remote computing system 60) based on executing instructions stored on memory hardware 720 (e.g., the memory hardware 14 of the user device 10 or the memory hardware 64 of the remote computing system 60).

At operation 402, the method 400*a* includes receiving training data 401 (FIG. 1) that includes transcribed source task speech utterances 106 associated with a first source task and a second source task, a first set of un-transcribed source task speech utterances 106 associated with the first source task, each first un-transcribed source task speech utterance 106 in the first set of un-transcribed source task speech utterances 106 is not paired with a corresponding transcription, a second set of un-transcribed source task speech utterances 106 associated with the second source task, each second set of un-transcribed source task speech utterances 106 is not paired with a corresponding transcription, and un-transcribed target task speech utterances 106 associated with a target task, each un-transcribed target task speech utterance 106 is not paired with a corresponding transcription. Here, the transcribed source task speech utterances 106 associated with the first source task may include a first amount of training data, and the un-transcribed target task speech utterances associated with the target task may include a second amount of training data, wherein the first amount of training data greater than the second amount of training data. Example source tasks include, but are not limited to, a source language, a source speech domain, and a source speech characteristic of a source speaker. Example target tasks include, but are not limited to, a target language, a target speech domain, and a target speech characteristic of a target speaker.

At operation 404, the method 400*a* includes training a primary ASR model (i.e., the ASR model 200) based on the transcribed source task speech utterances 106 associated with the first source task and the second source task. In some implementations, the primary ASR model is also trained based on the first and second sets of un-transcribed source task speech utterances 106. Here, the trained primary ASR model includes a plurality of model parameter values $\Theta_{PT}$. In some examples, the primary ASR model is trained using the example supervised training process 500 of FIG. 5.

In some implementations, training the primary ASR model includes: initializing the primary ASR model with a second plurality of model parameters and training the primary ASR model based on a first set of the transcribed source task speech utterances associated with the first source task to determine a third source task vector; re-initializing the primary ASR model with the second plurality of model parameters and re-training the re-initialized primary ASR model based on a second set of the transcribed source task speech utterances associated with the second source task to determine a fourth source task vector; and adapting parameter values of the primary ASR model based on the third source task vector and the fourth source task vector to teach the adapted ASR model how to recognize speech associated with the first target task and the second target task. Here, adapting the parameter values of the ASR model includes determining a sum of the second plurality of model parameter values, a first product of a first scale factor and the third source task vector, and a second product of a second scale factor and the fourth source task vector.

At operation 406, the method 400*a* includes initializing an auxiliary ASR model with the plurality of model parameter values $\Theta_{PT}$ of the trained primary ASR and training, using an un-supervised learning technique, the initialized auxiliary ASR model based on the first set of un-transcribed source task speech utterances 106 associated with the first source task to determine a first source task vector $\tau_{task1}$. In some implementations, the auxiliary ASR model includes the primary ASR model. Here, the first source task vector $\tau_{task1}$ represents a difference between the plurality of model parameter values $\Theta_{PT}$ of the trained primary ASR model and a plurality of model parameters of the auxiliary ASR model trained based on the first set of un-transcribed source task speech utterances 106 associated with the first source task.

At operation 408, the method 400*a* includes re-initializing the auxiliary ASR model with the plurality of model parameter values $\Theta_{PT}$ of the trained primary ASR and re-training, using an un-supervised learning technique, the re-initialized auxiliary ASR model based on the second set of un-transcribed source task speech utterances 106 associated with the second source task to determine a second source task vector $\tau_{task2}$. Here, the second source task vector $\tau_{task2}$ represents a difference between the plurality of model parameter values $\Theta_{PT}$ of the trained primary ASR model and a plurality of model parameters of the re-trained auxiliary ASR model trained based on the second set of un-transcribed source task speech utterances 106 associated with the second source task.

At operation 410, the method 400*a* includes re-initializing the auxiliary ASR model with the plurality of model parameter values $\Theta_{PT}$ of the trained primary ASR and re-training, using an un-supervised learning technique, the re-initialized auxiliary ASR model based on the un-transcribed target task speech utterances 106 associated with the target task to determine a target task vector $\tau_{target}$. Here, the target task vector $\tau_{target}$ represents a difference between the plurality of model parameter values $\Theta_{PT}$ of the trained primary ASR model and a plurality of model parameters of the re-trained auxiliary ASR model re-trained based on the un-transcribed target task speech utterances 106 associated with the target task.

Figure 6:
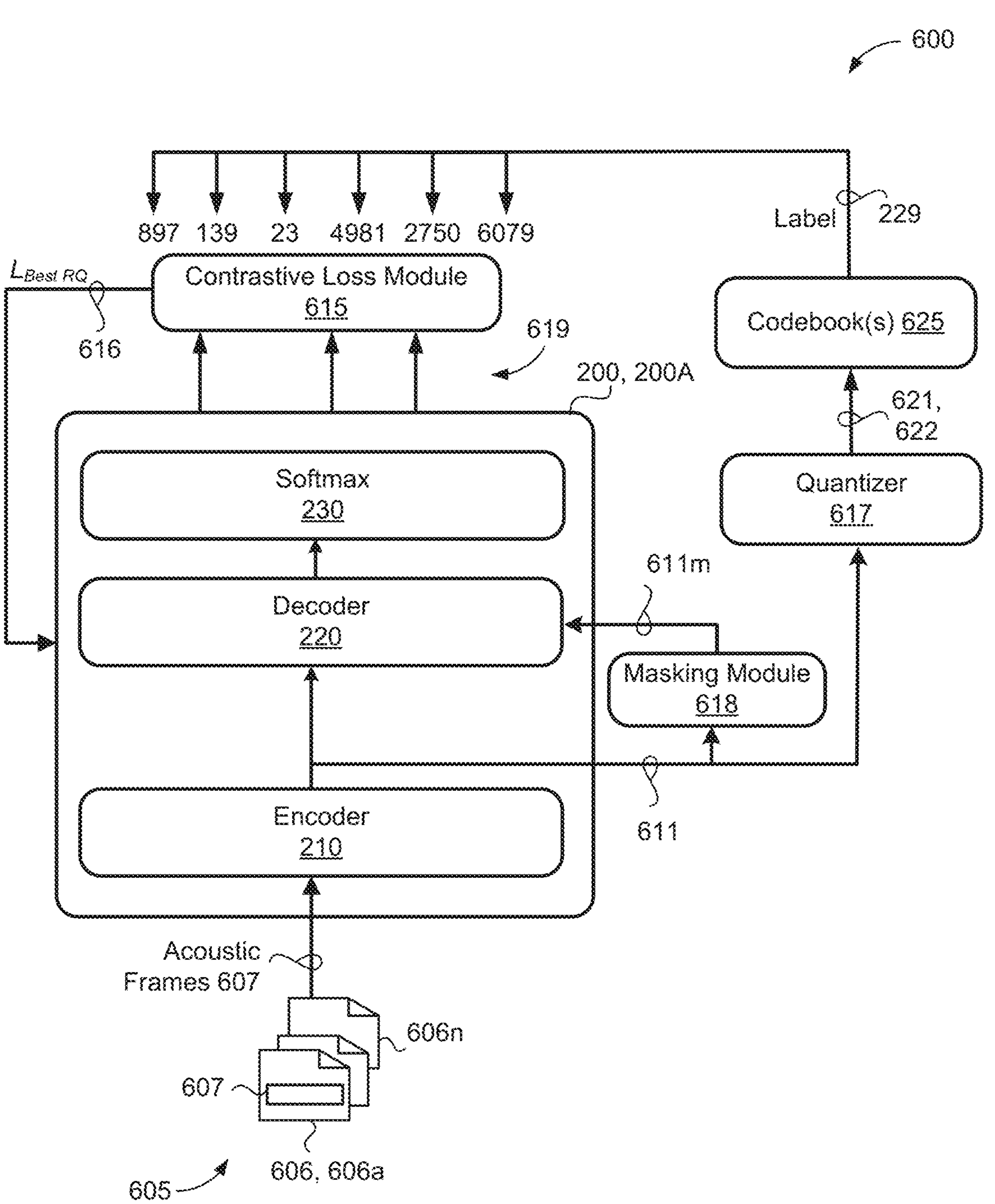
FIG. 6 is a schematic view of an example unsupervised training process.

In some examples, the auxiliary ASR model is trained at operations 406, 408 and 410 based on a particular set of un-transcribed speech utterances 106 using the example un-supervised training process 600 of FIG. 6. Additionally or alternatively, the un-supervised training technique for training the auxiliary ASR model based on a particular set of un-transcribed speech utterances includes training using bidirectional encoder representations from transformers (BERT) based Speech pre-Training with Random-projection Quantization (BEST-RQ).

At operation 412, the method 400*a* includes determining a first correlation between the first source task vector $\tau_{task1}$ and the target task vector $\tau_{target}$. At operation 414, the method 400*a* includes determining a second correlation between the second source task vector $\tau_{task2}$ and the target task vector $\tau_{target}$. At operation 416, the method 400*a* includes adapting parameters of the trained primary ASR model based on the first source task vector $\tau_{task1}$, the second source task vector $\tau_{task2}$, the first correlation, and the second correlation to teach the trained primary ASR model to learn how to recognize speech associated with the target task. In some implementations, adapting the parameters of the trained primary ASR model to learn how to recognize speech associated with the target task includes adapting the parameters of the trained primary ASR model without using any transcribed speech utterances in the target task for supervised learning. In some examples, the parameters of the primary ASR model are adapting using:

$$\Theta^{new} = Q_{PT} + \lambda_1 * \tau_{task1} + \lambda_2 * \tau_{task2} \quad (2)$$

where $\Theta^{new}$ are the adapted parameters of the primary ASR model, the parameter $\lambda_1$ is selected to track a correlation between $\tau_{task1}$ and $\tau_{target}$, and the parameter $\lambda_2$ is selected to track a correlation between $\tau_{task2}$ and $\tau_{target}$. Here, correlations based on the auxiliary ASR model will approximate correlations between the tasks based on the primary ASR model. In some examples, the parameter $\lambda_1$ is determined by applying a Softmax function to the correlation of the task vectors $\tau_{task1}$ and $\tau_{target}$, and the parameter $\lambda_2$ is determined by applying a Softmax function to the correlation of the task vectors $\tau_{task2}$ and $\tau_{target}$.

Figure 4B:
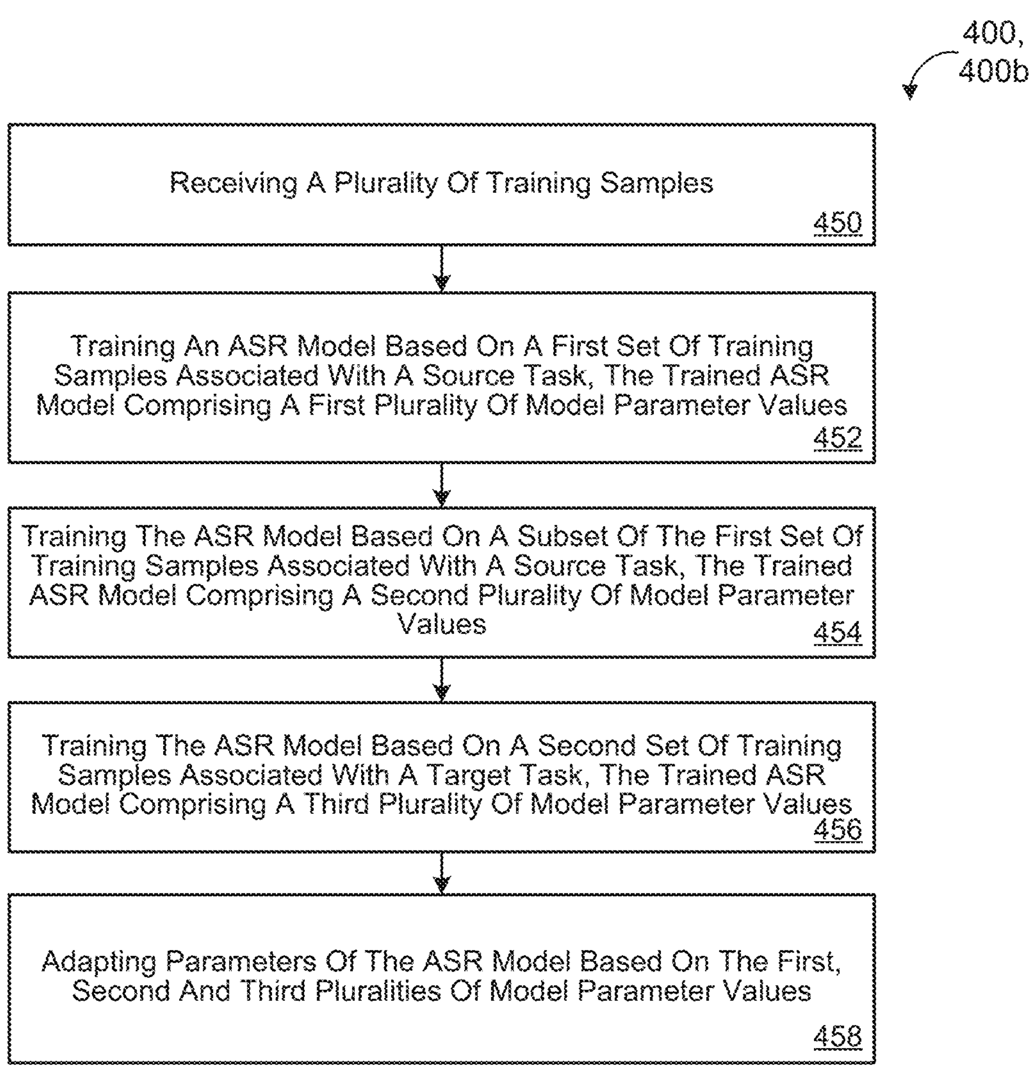
FIG. 4B is a flowchart of an arrangement of operations for another example computer-implemented method for performing task expansion for a target task having a limited amount of training data.

FIG. 4B is a flowchart of an exemplary arrangement of operations for a computer-implemented task expansion training method 400, 400*b* for performing task expansion of the ASR model 200 for a target task have a limited amount of training data using task vectors. The operations of FIG. 4B may be performed by data processing hardware 710 (FIG. 7) (e.g., the data processing hardware 12 of the user device 10 or the data processing hardware 62 of the remote computing system 60) based on executing instructions stored on memory hardware 720 (e.g., the memory hardware 14 of the user device 10 or the memory hardware 64 of the remote computing system 60).

At operation 450, the method 400*b* includes receiving training data 401 (FIG. 1) that includes a first set of training samples associated with a source task, and a second set of training samples associated with a target task. Here, the first set of training samples may include substantially more training samples than the second set of training samples.

At operation 452, the method 400*b* includes training an ASR model (e.g., the ASR model 200) based on the first set of training samples. The resulting trained ASR models includes a first plurality of model parameter values $\Theta^{source\text{-}full}$.

At operation 454, the method 400*b* includes training the ASR model (e.g., the ASR model 200) based on a subset of the first set of training samples. The resulting trained ASR models includes a second plurality of model parameter values $\Theta^{source\text{-}subset}$. Here, the subset of the first set of training samples may be randomly selected and may have approximately the same number of training samples as the second set of training samples.

At operation 456, the method 400*b* includes training the ASR model (e.g., the ASR model 200) based on the second set of training samples. The resulting trained ASR models includes a third plurality of model parameter values $\Theta^{target}$.

At operation 458, the method 400*b* includes adapting parameters of the ASR model based on the first, second, and third pluralities of model parameter values. In some implementations, the method 400*b* adapts the parameters of the ASR model using $$\Theta^{target-new} = \Theta^{target} + \lambda * \left(\Theta^{source-full} - \Theta^{source-subset}\right) \quad (3)$$

where $\Theta^{target\text{-}new}$ approximates a training of the ASR model with a larger set of training samples for the target task. Here, Equation (3) relies on an analogy that a task vector $\tau_{source}$ determined from training the ASR model with the first set of training samples is to a task vector $\tau_{source\text{-}subset}$ determined from training the ASR model with the subset of the first set of training samples as a task vector $\tau_{target}$ determined from training the ASR model with the second set of training samples is to a task vector $\tau_{target\text{-}expanded}$ that would be determined from training the ASR model with a larger set of training samples for the target task.

Figure 5:
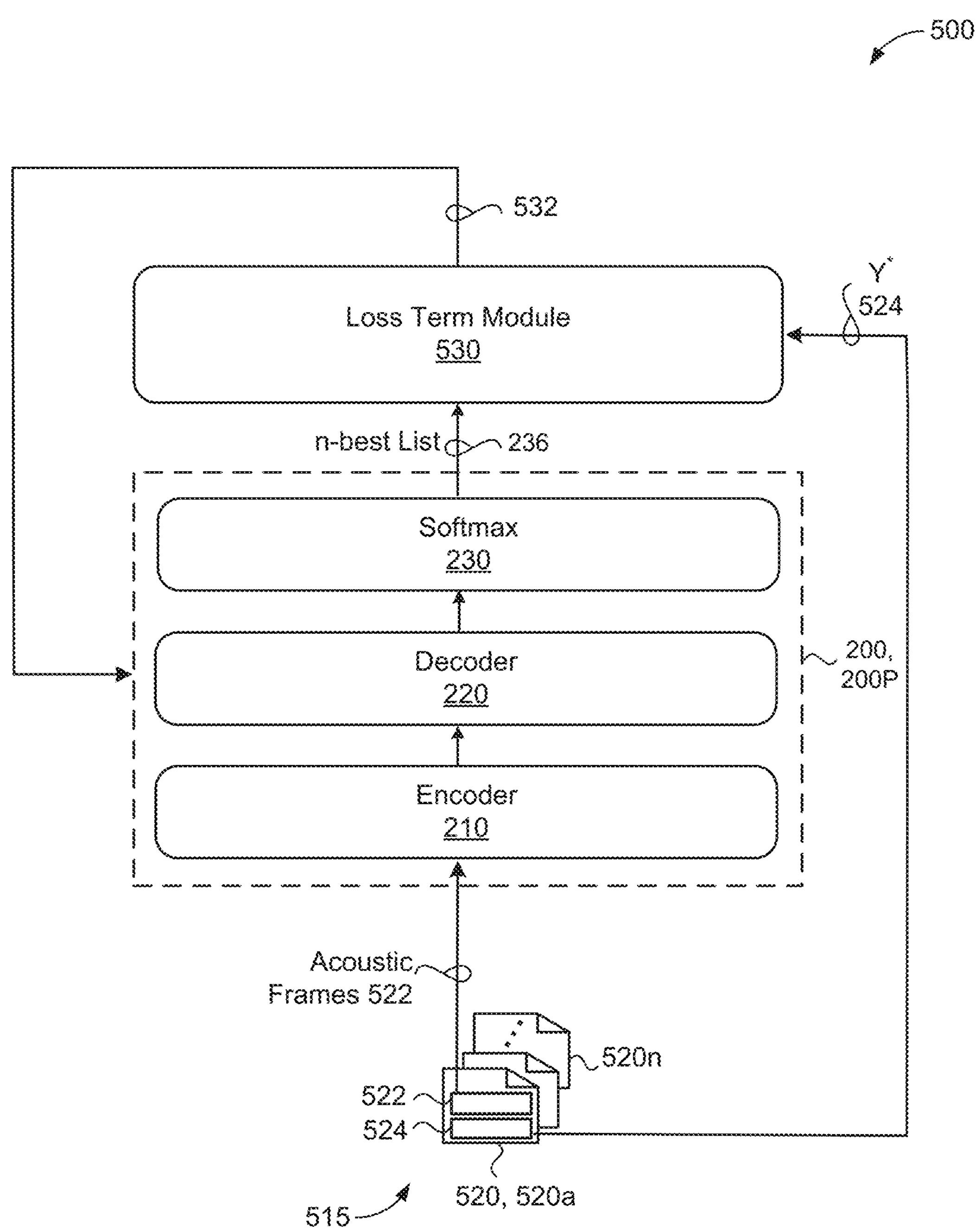
FIG. 5 is a schematic view of an example supervised training process.

FIG. 5 is a schematic view of an example training process 500 for training a primary ASR model 200, 200P using a supervised learning technique. In this example, the ASR model 510 includes an RNN-T model including the encoder 210, the decoder 220, and the Softmax layer 230 (see FIG. 2). The training process 500 may execute on the remote computing system 60 (i.e., on the data processing hardware 62) or on the user device 10 (i.e., on the data processing hardware 12). In the example shown, the training process 500 trains the ASR model 200P using a training data set 515 that includes a plurality of training samples 520, 520*a-n*. Here, each particular training sample 520 of the plurality of training samples 520 includes a corresponding sequence of acoustic frames 522 characterizing a corresponding training utterance 106, and a corresponding ground-truth transcription 524 of the corresponding training utterance 106.

For each particular training sample 520 in the training data set 515, the training process 500 processes, using the ASR model 200P, the corresponding sequence of acoustic frames 522 to obtain a corresponding n-best list of speech recognition hypotheses $Y_{i=1:n}$ 236 output by the Softmax layer 230. Thereafter, for each particular training sample 520, a loss term module 530 receives the corresponding n-best list of speech recognition hypotheses $Y_{i=1:n}$ 236 output by the ASR model 200P for the particular training sample 520. For the top-ranked hypothesis $Y_{top\text{-}ranked}$ of the n-best list of speech recognition hypotheses $Y_{i=1:n}$ 236, the loss term module 530 determines a loss 532 based on the corresponding ground-truth transcription Y* 524. Here, the loss 532 is an RNN-T loss for the top-ranked hypothesis $Y_{top\text{-}ranked}$ that is the negative log of the particular probability of the probability distribution 242 corresponding to the top-ranked hypothesis $Y_{top\text{-}ranked}$, which may be expressed as.

$$\mathcal{L}_{rnnt} = -\log p(Y_{top-ranked} \mid X) \quad (4)$$

Thereafter, the training process 500 trains the ASR model 200P based on the losses 532 to teach ASR model 200P to reduce the losses 532. In some examples, the training process 500 trains the ASR model 200P by adjusting, adapting, updating, fine-tuning, etc. one or more parameters or weights of at least one of the encoder 210 or the decoder 220.

FIG. 6 is a schematic view of an example training process 600 for training an auxiliary ASR model 200, 200A using an un-supervised learning technique. In some implementations, the training process 600 includes BEST-RQ self-supervised learning. In the example shown, the ASR model 200A includes an RNN-T model including the encoder 210, the decoder 220, and the Softmax layer 230 (see FIG. 2). The training process 600 may execute on the remote computing system 60 (i.e., on the data processing hardware 62) or on the user device 10 (i.e., on the data processing hardware 12). In the example shown, the training process 600 trains the ASR model 200A using a training data set 605 that includes a plurality of training samples 606, 606*a-n*. Here, each particular training sample 606 of the plurality of training samples 606 includes a corresponding sequence of acoustic frames 607 characterizing a corresponding training utterance 106, but does not include a corresponding ground-truth transcription of the corresponding training utterance 106.

The training process 600 trains the encoder 210 of the ASR model 200A based on contrastive losses ($L_{Best\ RQ}$) 616 derived using contrastive self-supervised losses for the training data set 605. For each training sample 606 of the training data set 605, the encoder 210 processes the corresponding acoustic frames 607 to generate corresponding encoded audio features 611. In the illustrate example, the encoded audio features 611 (i.e., interchangeably referred to as "encoded features 611") output from the encoder 210 are fed to a masking module 618 where some of the encoded features 611 are randomly chosen and replaced with a trained feature vector shared between all masked time steps to provide corresponding masked encoded audio features 611*m*. In some examples, the masking module 618 masks the randomly chosen encoded features 611 for masking by randomly sampling without replacement a certain proportion p of all time steps to be start indices and then masks the subsequent M consecutive time steps from every sample index, whereby some spans may overlap.

After masking is applied, the decoder 220 receives and processes the masked encoded features 611*m* (or encoded features 611 not chosen by the masking module 618), and the Softmax layer 230 outputs corresponding contrastive context vectors (i.e., encoded representation) 617 from the masked encoded features 611*m*.

A quantizer 617 also receives the encoded features 611 as input, and applies random projections to generate, at each of a plurality of output steps, a target quantized vector token 621 and a target token index 622 for a corresponding encoded feature 611 as output. As such, the quantizer 617 generates the target quantized vector token 621 and the target token index 622 using the encoded representations 611 that do not include any masking. Here, the quantizer 617 generates the target quantized vector tokens 621 according to $$q_i \in \{e_j\}_{j=1}^{V}.$$

The quantizer 617 summarizes all of the encoded features 611 into representative target quantized vector tokens (i.e., discriminative speech tokens) 621. The representative target quantized vector tokens 621 generated by the quantizer 617 represent a finite set of representative target quantized vector tokens referred to as a codebook 625. The target token index maps each corresponding encoded feature 611 to a respective one of the target quantized vector tokens 621 stored in the codebook 625. In some implementations, the quantizer 617 projects the target context vector 621 to a randomly initialized codebook 625 that maps the target context vectors 621 to discrete labels 629 by finding a nearest vector in the codebook 625. Here, the quantizer 617 may include a random-projection quantizer 617 configured to randomly initialize a matrix and the codebook 625. The random-projection quantizer 617 uses the matrix to project the encoded features 611 into the target context vectors 621 and uses the codebook 625 to find a nearest vector where an index of the vector includes the label 629. In some examples, the codebook 625 finds the nearest vector by determining a cosine similarity as a distance measurement.

Thereafter, a contrastive loss module 615 derives, for each training sample 620, a contrastive loss term ($L_{Best\ RQ}$) 616 between outputs 619 of the ASR model 610 at the masked positions and the target context vectors 621 as follows.

$$L = -\log\frac{\exp(\mathrm{sim}(c_t, q_t)/k)}{\sum_{\tilde{q}\sim Q_t}\exp(\mathrm{sim}(c_t, \tilde{q})/k)} \quad (5)$$

where $c_t$ is contrastive context vector 619 centered over a masked time step t and $q_t$ represents a target context vector 621 at the time step t in a set of K+1 candidate target context vectors 621 which includes $q_t$ and K distractors. Distractors may be uniformly sampled from other masked time steps of the same utterance.

Thereafter, the training process 600 trains the ASR model 200A based on the losses 616 to teach ASR model 200A to reduce the losses 616. In some examples, the training process 600 trains the ASR model 200A by adjusting, adapting, updating, fine-tuning, etc. one or more parameters or weights of at least one of the encoder 210 or the decoder 220.

Figure 7:
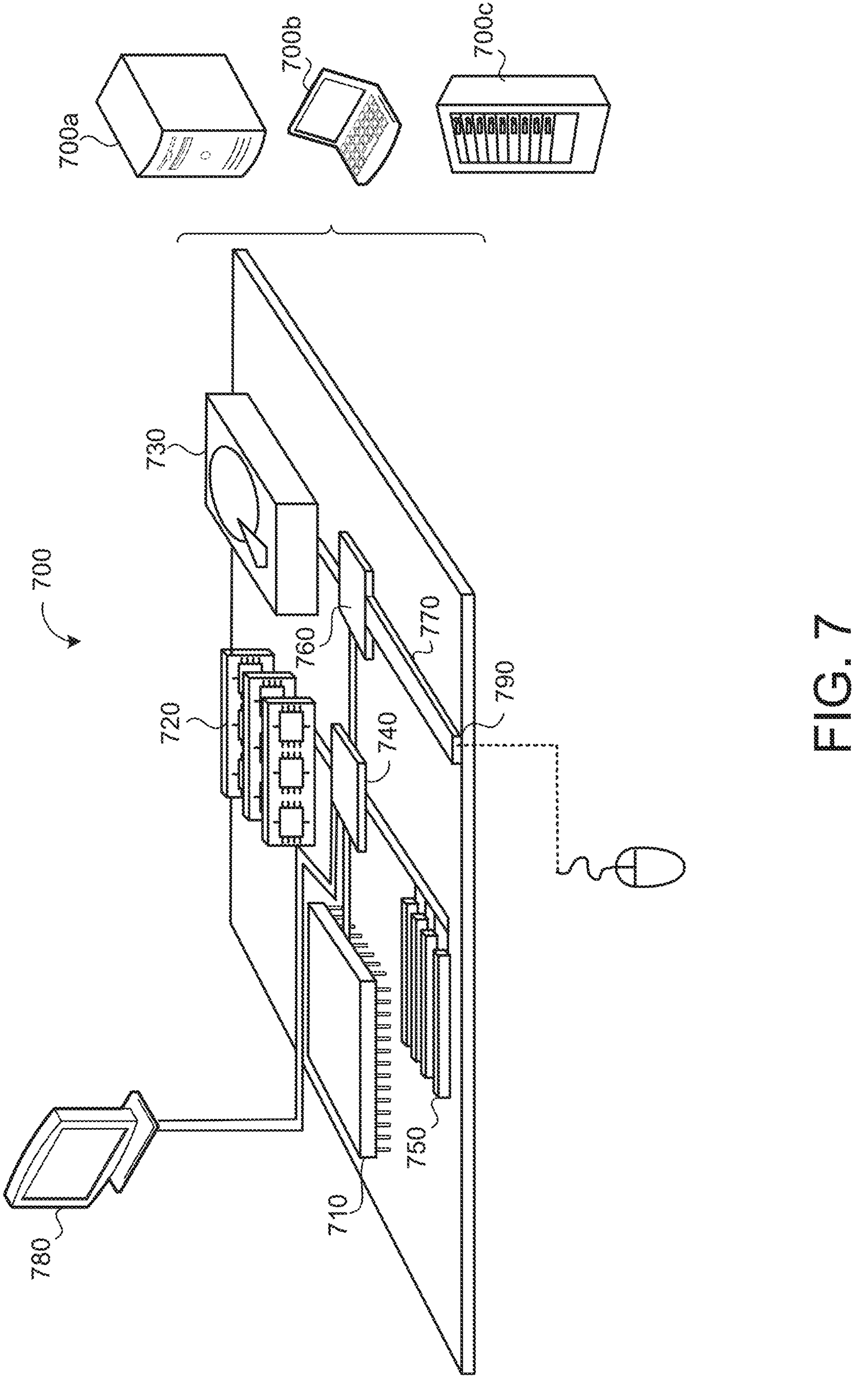
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710 (i.e., data processing hardware) that can be used to implement the data processing hardware 12 and/or 62, memory 720 (i.e., memory hardware) that can be used to implement the memory hardware 14 and/or 64, a storage device 730 (i.e., memory hardware) that can be used to implement the memory hardware 14 and/or 64, a high-speed interface/controller 740 connecting to the memory 720 and high-speed expansion ports 750, and a low speed interface/controller 770 connecting to a low speed bus 770 and a storage device 730. Each of the components 710, 720, 730, 740, 750, and 770, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 770 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 770 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, "or" refers to an inclusive or and not to an exclusive or. For example, "A, B, or C" refers to any combination or subset of A, B, C such as: (1) A alone; (2) B alone; (3) C alone; (4) A with B; (5) A with C; (6) B with C; and (7) A with B and with C. Similarly, the phrase "at least one of A or B" is intended to refer to any combination or subset of A and B such as: (1) at least one A; (2) at least one B; and (3) at least one A and at least one B. Moreover, the phrase "at least one of A and B" is intended to refer to any combination or subset of A and B such as: (1) at least one A; (2) at least one B; and (3) at least one A and at least one B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:

receiving training data comprising:

transcribed source task speech utterances associated with a first source task and a second source task;

a first set of un-transcribed source task speech utterances associated with the first source task, each first un-transcribed source task speech utterance in the first set of un-transcribed source task speech utterances is not paired with a corresponding transcription;

a second set of un-transcribed source task speech utterances associated with the second source task, each second set of un-transcribed source task speech utterances is not paired with a corresponding transcription; and un-transcribed target task speech utterances associated with a target task, each un-transcribed target task speech utterance is not paired with a corresponding transcription;

training a primary automatic speech recognition (ASR) model based on the transcribed source task speech utterances associated with the first source task and the second source task, the trained primary ASR model comprising a plurality of model parameter values;

training, using an un-supervised learning technique, an auxiliary ASR model initialized with the plurality of model parameter values of the trained primary ASR model based on the first set of un-transcribed source task speech utterances associated with the first source task to determine a first source task vector;

training, using the un-supervised learning technique, the auxiliary ASR model initialized with the plurality of model parameter values of the trained primary ASR model based on the second set of un-transcribed source task speech utterances associated with the second source task to determine a second source task vector;

training, using the un-supervised learning, the auxiliary ASR model initialized with the plurality of model parameter values of the trained primary ASR model based on the un-transcribed target task speech utterances associated with the target task to determine a target task vector;

determining a first correlation between the first source task vector and the target task vector;

determining a second correlation between the second source task vector and the target task vector; and adapting parameters of the trained primary ASR model based on the first source task vector, the second source task vector, the first correlation, and the second correlation to teach the trained primary ASR model to learn how to recognize speech associated with the target task.

2. The computer-implemented method of claim 1, wherein adapting the parameters of the trained primary ASR model to learn how to recognize speech associated with the target task comprises adapting the parameters of the trained primary ASR model without using any transcribed speech utterances in the target task for supervised learning.

3. The computer-implemented method of claim 1, wherein the un-supervised learning technique for training the auxiliary ASR model based on the first set of un-transcribed source task speech utterances, the second set of un-transcribed source task speech utterances, and the un-transcribed target task speech utterances comprises Bidirectional Encoder Representations from Transformers (BERT) based Speech pre-Training with Random-projection Quantization (BEST-RQ).

4. The computer-implemented method of claim 1, wherein the un-supervised learning technique for training the auxiliary ASR model based on a particular set of un-transcribed source task speech utterances comprises:

for each corresponding un-transcribed speech utterance in the particular set of un-transcribed speech utterances:

generating, at each of a plurality of output steps, using a random-projection quantizer, a target quantized vector token and a target token index for a corresponding audio feature in a sequence of audio features associated with the corresponding un-transcribed speech utterance, wherein the target token index maps the corresponding audio feature to the target quantized vector token stored in one or more codebooks;

after masking a subset of the audio features in the sequence of audio features associated with the corresponding un-transcribed speech utterance, generating contrastive context vectors from corresponding masked audio features; and deriving a contrastive loss term between the contrastive context vectors at the masked positions and the target token index; and pretraining an audio encoder of the auxiliary ASR model based on the contrastive loss terms determined for the particular set of un-transcribed speech utterances.

5. The computer-implemented method of claim 1, wherein training the primary ASR model comprises training the primary ASR model, using supervised learning, based on the transcribed source task speech utterances, and each transcribed source task speech utterance paired with a corresponding transcription.

6. The computer-implemented method of claim 1, wherein training the primary ASR model comprises:

training the primary ASR model initialized with a second plurality of model parameter values based on a first set of the transcribed source task speech utterances associated with the first source task to determine a third source task vector;

training the primary ASR model initialized with the second plurality of model parameter values based on a second set of the transcribed source task speech utterances associated with the second source task to determine a fourth source task vector; and adapting parameter values of the primary ASR model based on the third source task vector and the fourth source task vector to teach the ASR model how to recognize speech associated with the first source task and the second source task.

7. The computer-implemented method of claim 6, wherein adapting the parameter values of the primary ASR model comprises determining a sum of:

the second plurality of model parameter values;

a first product of a first scale factor and the third source task vector; and a second product of a second scale factor and the fourth source task vector.

8. The computer-implemented method of claim 1, wherein:

the transcribed source task speech utterances associated with the first source task comprise a first amount of training data;

the un-transcribed target task speech utterances associated with the target task comprise a second amount of training data; and the first amount of training data greater than the second amount of training data.

9. The computer-implemented method of claim 1, wherein the source task comprises at least one of:

a source language;

a source speech domain; or a source speech characteristic of a source speaker.

10. The computer-implemented method of claim 1, wherein the target task comprises at least one of:

a target language;

a target speech domain; or a target speech characteristic of a target speaker.

11. A system comprising:

data processing hardware; and memory hardware in communication with the data processing hardware and storing instructions that, when executed on the data processing hardware, causes the data processing hardware to perform operations comprising:

receiving training data comprising:

transcribed source task speech utterances associated with a first source task and a second source task;

a first set of un-transcribed source task speech utterances associated with the first source task, each first un-transcribed source task speech utterance in the first set of un-transcribed source task speech utterances is not paired with a corresponding transcription;

a second set of un-transcribed source task speech utterances associated with the second source task, each second set of un-transcribed source task speech utterances is not paired with a corresponding transcription; and un-transcribed target task speech utterances associated with a target task, each un-transcribed target task speech utterance is not paired with a corresponding transcription;

training a primary automatic speech recognition (ASR) model based on the transcribed source task speech utterances associated with the first source task and the second source task, the trained primary ASR model comprising a plurality of model parameter values;

training, using an un-supervised learning technique, an auxiliary ASR model initialized with the plurality of model parameter values of the trained primary ASR model based on the first set of un-transcribed source task speech utterances associated with the first source task to determine a first source task vector;

training, using the un-supervised learning technique, the auxiliary ASR model initialized with the plurality of model parameter values of the trained primary ASR model based on the second set of un-transcribed source task speech utterances associated with the second source task to determine a second source task vector;

training, using the un-supervised learning, the auxiliary ASR model initialized with the plurality of model parameter values of the trained primary ASR model based on the un-transcribed target task speech utterances associated with the target task to determine a target task vector;

determining a first correlation between the first source task vector and the target task vector;

determining a second correlation between the second source task vector and the target task vector; and adapting parameters of the trained primary ASR model based on the first source task vector, the second source task vector, the first correlation, and the second correlation to teach the trained primary ASR model to learn how to recognize speech associated with the target task.

12. The system of claim 11, wherein adapting the parameters of the trained primary ASR model to learn how to recognize speech associated with the target task comprises adapting the parameters of the trained primary ASR model without using any transcribed speech utterances in the target task for supervised learning.

13. The system of claim 11, wherein the un-supervised learning technique for training the auxiliary ASR model based on the first set of un-transcribed source task speech utterances, the second set of un-transcribed source task speech utterances, and the un-transcribed target task speech utterances comprises Bidirectional Encoder Representations from Transformers (BERT) based Speech pre-Training with Random-projection Quantization (BEST-RQ).

14. The system of claim 11, wherein the un-supervised learning technique for training the auxiliary ASR model based on a particular set of un-transcribed source task speech utterances comprises:

for each corresponding un-transcribed speech utterance in the particular set of un-transcribed speech utterances:

generating, at each of a plurality of output steps, using a random-projection quantizer, a target quantized vector token and a target token index for a corresponding audio feature in a sequence of audio features associated with the corresponding un-transcribed speech utterance, wherein the target token index maps the corresponding audio feature to the target quantized vector token stored in one or more codebooks;

after masking a subset of the audio features in the sequence of audio features associated with the corresponding un-transcribed speech utterance, generating contrastive context vectors from corresponding masked audio features; and deriving a contrastive loss term between the contrastive context vectors at the masked positions and the target token index; and pretraining an audio encoder of the auxiliary ASR model based on the contrastive loss terms determined for the particular set of un-transcribed speech utterances.

15. The system of claim 11, wherein training the primary ASR model comprises training the primary ASR model, using supervised learning, based on the transcribed source task speech utterances, and each transcribed source task speech utterance paired with a corresponding transcription.

16. The system of claim 11, wherein training the primary ASR model comprises:

training the primary ASR model initialized with a second plurality of model parameter values based on a first set of the transcribed source task speech utterances associated with the first source task to determine a third source task vector;

training the primary ASR model initialized with the second plurality of model parameter values based on a second set of the transcribed source task speech utterances associated with the second source task to determine a fourth source task vector; and adapting parameter values of the primary ASR model based on the third source task vector and the fourth source task vector to teach the ASR model how to recognize speech associated with the first source task and the second source task.

17. The system of claim 16, wherein adapting the parameter values of the primary ASR model comprises determining a sum of:

the second plurality of model parameter values;

a first product of a first scale factor and the third source task vector; and a second product of a second scale factor and the fourth source task vector.

18. The system of claim 11, wherein:

the transcribed source task speech utterances associated with the first source task comprise a first amount of training data;

the un-transcribed target task speech utterances associated with the target task comprise a second amount of training data; and the first amount of training data greater than the second amount of training data.

19. The system of claim 11, wherein the source task comprises at least one of:

a source language;

a source speech domain; or a source speech characteristic of a source speaker.

20. The system of claim 11, wherein the target task comprises at least one of:

a target language;

a target speech domain; or a target speech characteristic of a target speaker.

* * * * *